US008028416B2

(12) United States Patent
Lee et al.

(10) Patent No.: US 8,028,416 B2
(45) Date of Patent: Oct. 4, 2011

(54) HYBRID COMPOSITE JOURNAL BEARING AND MANUFACTURING METHOD THEREOF

(75) Inventors: Dai Gil Lee, Daejeon (KR); Hyoung Geun Kim, Daejeon (KR); Seong Su Kim, Gyeongsangnam-do (KR); Kyung Kun Bang, Gyeonggi-do (KR)

(73) Assignees: Korea Advanced Institute of Science and Technology, Daejong (KR); Samsung Heavy Ind. Co., Ltd, Seoul (KR)

( * ) Notice: Subject to any disclaimer, the term of this patent is extended or adjusted under 35 U.S.C. 154(b) by 0 days.

(21) Appl. No.: 12/781,547

(22) Filed: May 17, 2010

(65) Prior Publication Data

US 2010/0218377 A1    Sep. 2, 2010

Related U.S. Application Data

(62) Division of application No. 11/274,046, filed on Nov. 15, 2005, now Pat. No. 7,757,403.

(51) Int. Cl.
*B21D 53/10* (2006.01)
(52) U.S. Cl. ............... 29/898.15; 29/898; 29/898.04; 29/898.042; 29/898.047; 29/898.059; 29/898.055; 156/156; 384/129
(58) Field of Classification Search ............... 29/898.15, 29/898, 898.04, 898.042, 898.047, 898.059, 29/898.055; 138/123; 156/156, 172, 188, 156/160, 191, 194; 384/206, 911
See application file for complete search history.

(56) References Cited

U.S. PATENT DOCUMENTS

| 4,173,670 | A | * | 11/1979 | VanAuken | 138/123 |
| 4,348,247 | A | * | 9/1982 | Loyd et al. | 156/156 |
| 4,717,268 | A | | 1/1988 | Orkin | |
| 4,853,172 | A | | 8/1989 | Jacaruso et al. | |
| 5,261,991 | A | | 11/1993 | Zackrisson et al. | |
| 6,126,770 | A | | 10/2000 | Lee et al. | |
| 6,336,986 | B1 | * | 1/2002 | Lee et al. | 156/172 |
| 6,863,763 | B2 | * | 3/2005 | Lee et al. | 156/188 |
| 2007/0140607 | A1 | | 6/2007 | Lee et al. | |

FOREIGN PATENT DOCUMENTS

| DE | 2016746 | 10/1970 |
| GB | 1236102 | 6/1971 |
| GB | 1532357 | 11/1978 |
| GB | 2381492 | 5/2003 |
| JP | 59-3071 | 1/1984 |

OTHER PUBLICATIONS

International Search Report for International Patent Application No. PCT/KR2004/001159 dated Aug. 17, 2004.

* cited by examiner

*Primary Examiner* — Richard Chang
(74) *Attorney, Agent, or Firm* — Kevin D. Jablonski; Graybeal Jackson LLP

(57) ABSTRACT

The object of this invention is to provide a hybrid composite journal bearing which is constructed so that a composite liner is positioned on an inner surface of a metal housing having a circular cross-section, thus preventing a journal from being broken or damaged or seized to the bearing, due to friction between the metal or composite journal and the journal bearing. The hybrid composite journal bearing (210) includes a metal housing (211) which is secured on an outer surface thereof to a bearing system and has a circular cross-section. A composite liner (212) is laminated to an inner surface of the metal housing (211) with a uniform thickness so as to minimize friction between the journal bearing and a journal.

1 Claim, 7 Drawing Sheets

HYBRID COMPOSITE JOURNAL BEARING AND MANUFACTURING METHOD THEREOF

PRIORITY CLAIM

The present application is a Divisional of U.S. patent application Ser. No. 11/274,046, filed Nov. 15, 2005, currently pending; which is a Continuation-in-Part of International Patent Application Serial No. PCT/KR04/01159, filed May 17, 2004, designating the United States, which claims foreign priority benefits under 35 USC §119(a) to Korean Patent Application No. 10-2003-0031094, filed May 16, 2003, which applications are incorporated herein by reference in their entirety.

TECHNICAL FIELD

The present invention relates, in general, to journal bearings and, more particularly, to a hybrid composite journal bearing constructed so that a composite liner is positioned on an inner surface of a metal housing having a circular cross-section. In particular, the present invention relates to a method of manufacturing such a hybrid composite journal bearing.

BACKGROUND ART

FIG. 1 is a schematic view to show a bearing system equipped with journal bearings which use oil as a lubrication fluid. As shown in FIG. 1, the bearing system includes a journal 130 and a stationary part 120. The journal 130, functioning to transmit power, is supported by the journal bearings 110. The journal bearings 110 are secured to the stationary part 120 which is made of a metal. Thus, heat generated in the journal bearings 110 is transmitted through the journal bearings 110 to the stationary part 120. When the temperature of lubricating oil rises in the journal bearings 110, thus the viscosity of the oil is reduced, and thereby a breakage of a lubrication film may be caused. Accordingly, in order to prevent the breakage of the oil film, heat conductivity of each journal bearing 110 is one of very important characteristics of a bearing.

Further, when the journal 130 starts or stops rotating, there is no enough pressure generated to support the journal 130 by a lubrication oil film, so that boundary lubrication condition occurs, that is, a part of each journal bearing 110 is in direct contact with the journal 130. When the journal bearings 110 are broken or damaged due to the contact between the journal 130 and the journal bearings 110 under the boundary lubrication condition, the friction coefficient and relative hardness between the journal 130 and the journal bearings 110 are recognized as important factors for bearing characteristics. When the journal 130 is driven under the boundary lubrication condition, a surface of the journal 130 may be damaged due to the contact between the journal 130 and the journal bearings 110. Further, viscosity of the lubrication oil is reduced by heat generated due to the contact between the journal 130 and each journal bearing 110, and a load bearing capacity of each journal bearing 110 is reduced, so that each journal bearing 110 may be undesirably adhered to the journal 130, thus causing seizure of each journal bearing 110 to the journal 130. Meanwhile, when an excessive load acts on each journal bearing 110 or viscosity of the lubrication oil is reduced, the oil film becomes thin, so that the above problems may occur.

Thus, in order to protect the rotating journal 130 and reduce generation of heat due to the friction between the journal 130 and each journal bearing 110, each journal bearing 110 must be made of a material which has lower hardness compared to the journal 130, and a lower friction coefficient and a high thermal conductivity coefficient.

Now, a white metal has been widely used as a material of a liner of the journal bearing. The liner is laminated to an inner surface of a metal housing having a circular cross-section. The white metal is an alloy including tin, lead, antimony, and copper, and meets the above-mentioned requirements of the journal bearing. However, the white metal has problems as follows. That is, since the white metal is a kind of metal, the white metal may be undesirably adhered to the journal made of a metal, due to melting caused when the white metal of the journal bearing is in direct contact with the journal and thereby temperature rises. Meanwhile, when the journal is made of a non-metal material, such as a composite, the journal may be broken or damaged due to relatively higher hardness of the white metal when there is friction between the journal bearing and the journal.

The journal bearing may be integrally manufactured using a glass fiber reinforced phenol composite which has a lower friction coefficient and relatively lower hardness. However, such a journal bearing is made of only the composite, so that the thickness of the journal bearing is increased. Due to the increased thickness, a physical property is deteriorated during the curing of the composite, and oil is absorbed in the composite during the operation of the journal bearing, so that dimensional precision is reduced, thus causing the journal bearing to be unstably driven. Thereby, the journal bearing may be broken or damaged. Further, since the composite absorbs oil during the operation of the journal bearing, the lubrication film is destroyed during the operation of the journal bearing or the oil film becomes thin, so that the journal bearing may be severely damaged.

DISCLOSURE OF THE INVENTION

Accordingly, the present invention has been made keeping in mind the above problems occurring in the prior art, and an object of the present invention is to provide a hybrid composite journal bearing which is constructed so that a thin composite liner with low friction coefficient is positioned on the inner surface of a metal housing having a circular cross-section, thus minimizing damage to a journal due to friction between the journal bearing and the journal.

Another object of the present invention is to provide a method of manufacturing the hybrid composite journal bearing, which is capable of avoiding the seizure of the journal to the bearing.

In order to accomplish the above object, the present invention provides a hybrid composite journal bearing, including a metal housing which is secured to a stationary part of a bearing system and supports a journal of the bearing system so that the journal is rotatable, and a composite liner which is laminated to an inner surface of the metal housing so as to minimize friction between the journal and the bearing and to increase thermal conductivity through bearing thickness.

Further, in order to accomplish the above object, the present invention provides a hybrid composite journal bearing, including a metal housing which is secured to a stationary part of a bearing system and supports a journal of the bearing system so that the journal is rotatable, a composite liner which is laminated to a predetermined portion of the journal where the metal housing is placed, and arranged in the metal housing, and a lubrication oil film which is provided between the composite liner and the metal housing.

In order to accomplish the above object, the present invention provides a method of manufacturing a hybrid composite journal bearing including a metal housing which is secured to a stationary part of a bearing system and supports a journal of the bearing system so that the journal is rotatable, the method including winding a composite prepreg with various laminated angles around a mandrel, with a release agent being coated on an outer surface of the mandrel, inserting the mandrel around which the composite prepreg is wound into the metal housing, and then, removing the mandrel from the metal housing, wrapping the composite prepreg and the metal housing with a vacuum bag, forming a vacuum in the vacuum bag so that the composite prepreg is in close contact with an inner surface of the metal housing, and putting the metal housing with the composite prepreg into an autoclave and curing the composite prepreg, and then, removing the vacuum bag.

In order to accomplish the above object, the present invention provides a method of manufacturing a hybrid composite journal bearing including a metal housing which is secured to a stationary part of a bearing system and supports a journal of the bearing system so that the journal is rotatable, the method including winding a composite prepreg with various laminated angles around a mandrel which is thermally expansible, inserting the mandrel around which the composite prepreg is wound into the metal housing, and putting the metal housing with the mandrel into an autoclave to thermally expand the mandrel so that the composite prepreg is cured while being in close contact with an inner surface of the metal housing, and removing the mandrel from the metal housing which is taken out of the autoclave.

Further, in order to accomplish the above object, the present invention provides a method of manufacturing a hybrid composite journal bearing including a metal housing which is secured to a stationary part of a bearing system and supports a journal of the bearing system so that the journal is rotatable, the method including covering each of opposite ends of a reinforcing unit having a fiber preform and a film with a cover, and placing the reinforcing unit into a metal housing, and securing the reinforcing unit in the metal housing by a support unit, feeding compressed air into the film so that the fiber preform is in close contact with an inner surface of the metal housing, injecting a resin into the reinforcing unit so that the resin is impregnated into the fiber preform, and supplying hot air into the film to harden the fiber preform impregnated with the resin, and removing the support unit and the cover from the metal housing, thus forming a composite liner.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
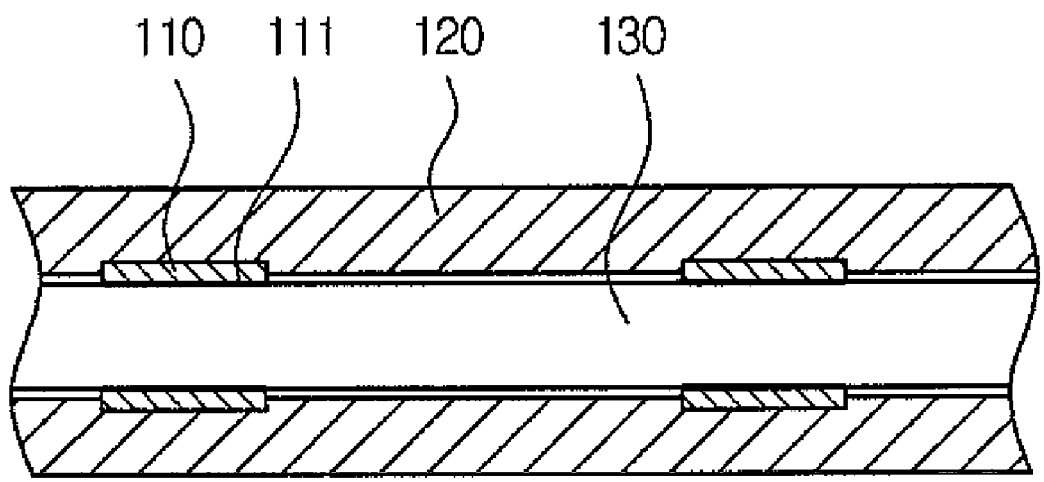
FIG. 1 is a schematic view to show a bearing system equipped with conventional journal bearings.

Reference should now be made to the drawings, in which the same reference numerals are used throughout the different drawings to designate the same or similar components.

Figure 2:
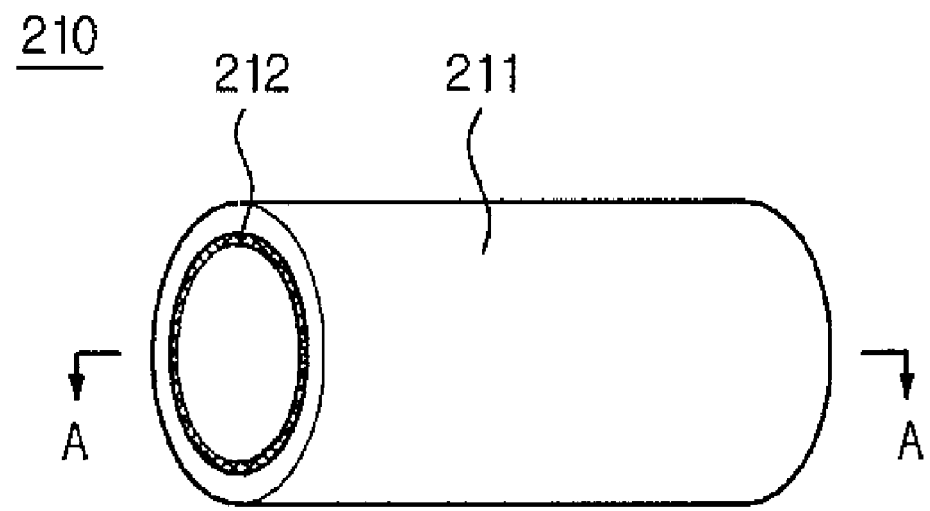
FIG. 2 is a perspective view of a hybrid composite journal bearing, according to the first embodiment of the present invention.
Figure 3:
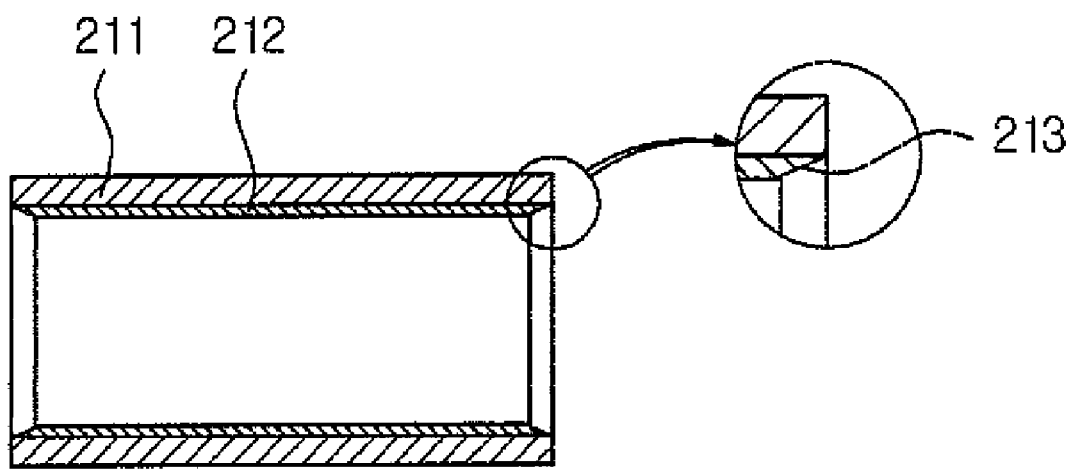
FIG. 3 is a sectional view taken along the line A-A of FIG. 2.

FIG. 2 is a perspective view of a hybrid composite journal bearing, according to the first embodiment of the present invention. FIG. 3 is a sectional view taken along the line A-A of FIG. 2, and FIG. 4 is a sectional view of a hybrid composite journal bearing, according to a modification of the first embodiment.

Figure 4:
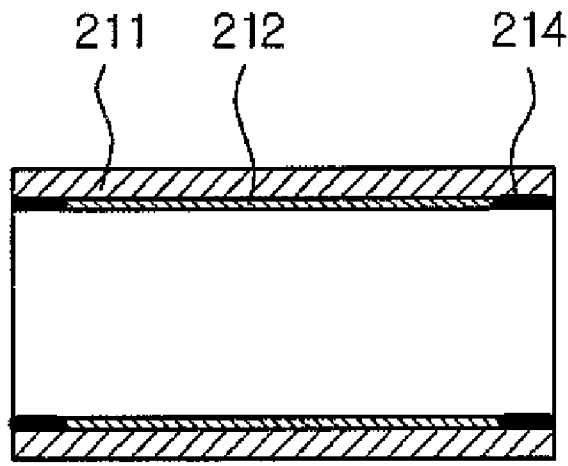
FIG. 4 is a sectional view of a hybrid composite journal bearing, according to a modification of the first embodiment.

As shown in FIGS. 2 through 4, the hybrid composite journal bearing 210 includes a metal housing 211 and a composite liner 212. The metal housing 211 is secured on an outer surface thereof to a journal bearing system, and has a circular cross-section. The composite liner 212 is laminated to an inner surface of the metal housing 211 with a uniform thickness so as to minimize friction between the journal bearing 210 and a journal of the bearing system.

The metal housing 211 is secured to a stationary part 120 of the journal bearing system, in a same manner as the journal bearing 110 of FIG. 1. It is unnecessary for the outer surface of the metal housing 211 to have a circular shape of FIGS. 2 through 4. That is, the shape of the outer surface of the metal housing 211 does not matter, if only the metal housing 211 is secured by the stationary part 120. However, an interior of the metal housing 211 must have a circular cross-section, because the journal having a circular cross-section is rotatable in the metal housing 211. Therefore, a housing for a conventional journal bearing may be used, in place of the metal housing 211 of this invention. Further, it is preferable that the metal housing 211 be made of a material having a high thermal conductivity, such as cast iron, aluminum alloy, and a babbit metal, so that heat generated during the rotation of the journal is easily transmitted to the stationary part.

Further, in view of a characteristic of the composite, the composite liner 212 has lower hardness than a conventional metallic journal but has the same hardness as a composite journal. It is possible to manufacture the composite liner 212, using various kinds of fibers and various kinds of resins. For example, the material of the composite liner 212 may be selected out of carbon fiber reinforced phenol composite including carbon fiber and phenol resin, carbon fiber reinforced epoxy composite including carbon fiber and epoxy resin, glass fiber reinforced epoxy composite including glass fiber and epoxy resin, glass fiber reinforced polyester composite including glass fiber and polyester resin, and others.

Of the above-mentioned composites, it is most preferable that the composite liner 212 be made of the carbon fiber reinforced phenol composite including carbon fiber and phenol resin. Since the carbon fiber reinforced phenol composite contains carbon fiber with an excellent lubrication characteristic, the carbon fiber reinforced phenol composite reduces the damage of the journal when there is a direct contact between the journal and the composite liner 212. Further, the carbon fiber has a higher thermal conductivity than the glass fiber which has been generally used, so that the carbon fiber efficiently transmits heat generated during the rotation of the journal through the metal housing 211 to the stationary part of the bearing system, thus enhancing the heat conductivity of the journal bearing 210.

Preferably, the composite liner 212 is laminated to the inner surface of the metal housing 211 with a relatively thin thickness. That is, the composite liner 212 functions to prevent the seizure between the journal and the journal bearing 210. As the composite liner 212 is thinner, so use of the expensive carbon fiber reinforced composite is minimized, thus reducing costs of the carbon fiber reinforced composite. Further, the thin composite liner 212 prevents oil from being undesirably absorbed, which reduces the dimensional change.

As such, the journal bearing 210 is constructed so that the composite liner 212 is provided on the inner surface of the metal housing 211 with a uniform thickness. However, according to the present invention, the composite liner 212 of the journal bearing 210 may be have tapered parts 213 which are tapered from an interior to an exterior of the composite liner 212. The formation of the tapered parts 213 on the composite liner 212 is advantageous particularly when the journal bearing 210 is applied to a large-sized journal, such as a journal for ships, which may sag by gravity. Due to the sag of the journal, a gap between the journal and the journal bearing 210 is changed, and further, distribution of pressure generated during the rotation of the journal is changed. Thus, when the amount of sag of the journal is large, the tapered parts 213 are provided at the opposite ends of the composite liner 212 considering the sag of the journal, thus preventing the composite liner 212 from being in surface contact with the journal due to the sag of the journal during the rotation of the journal.

Further, in the journal bearing 210 of this invention, it is preferable that a white metal 214 with excellent deformability be laminated to each end of the metal housing 211, as shown in FIG. 4, so that the opposite ends of the journal bearing 210 are deformed according to the amount of sag of the large-sized journal which may sag due to gravity. That is, the composite liner 212 is laminated to a large part of the inner surface of the metal housing 211, and the white metals 214 are respectively laminated at the outer ends of the metal housing 211 to be placed at sides of the composite liner 212.

The method of manufacturing the hybrid composite journal bearing constructed as described above will be described in the following in detail.

Figure 5:
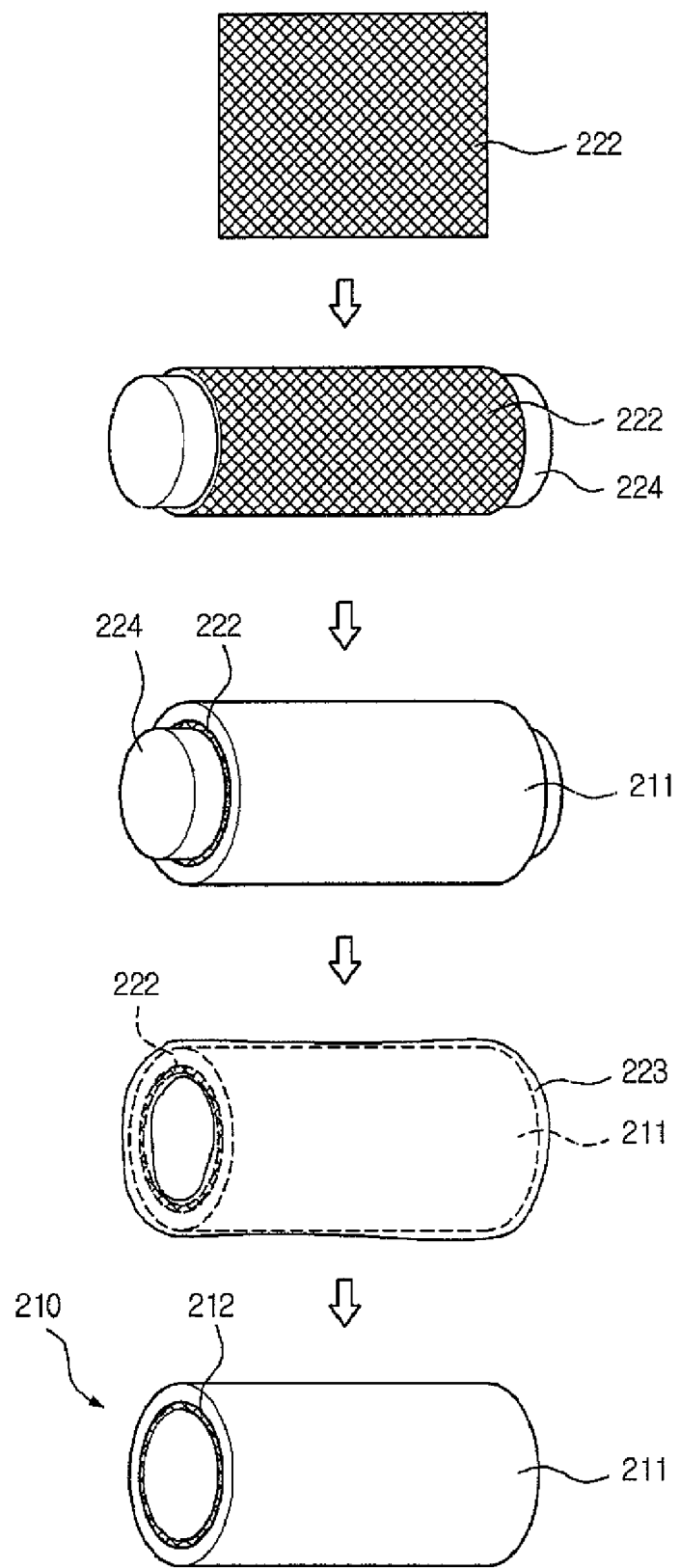
FIGS. 5 and 6 are views to show methods of manufacturing the hybrid composite journal bearing of FIG. 2, through a simultaneous curing process.
Figure 6:
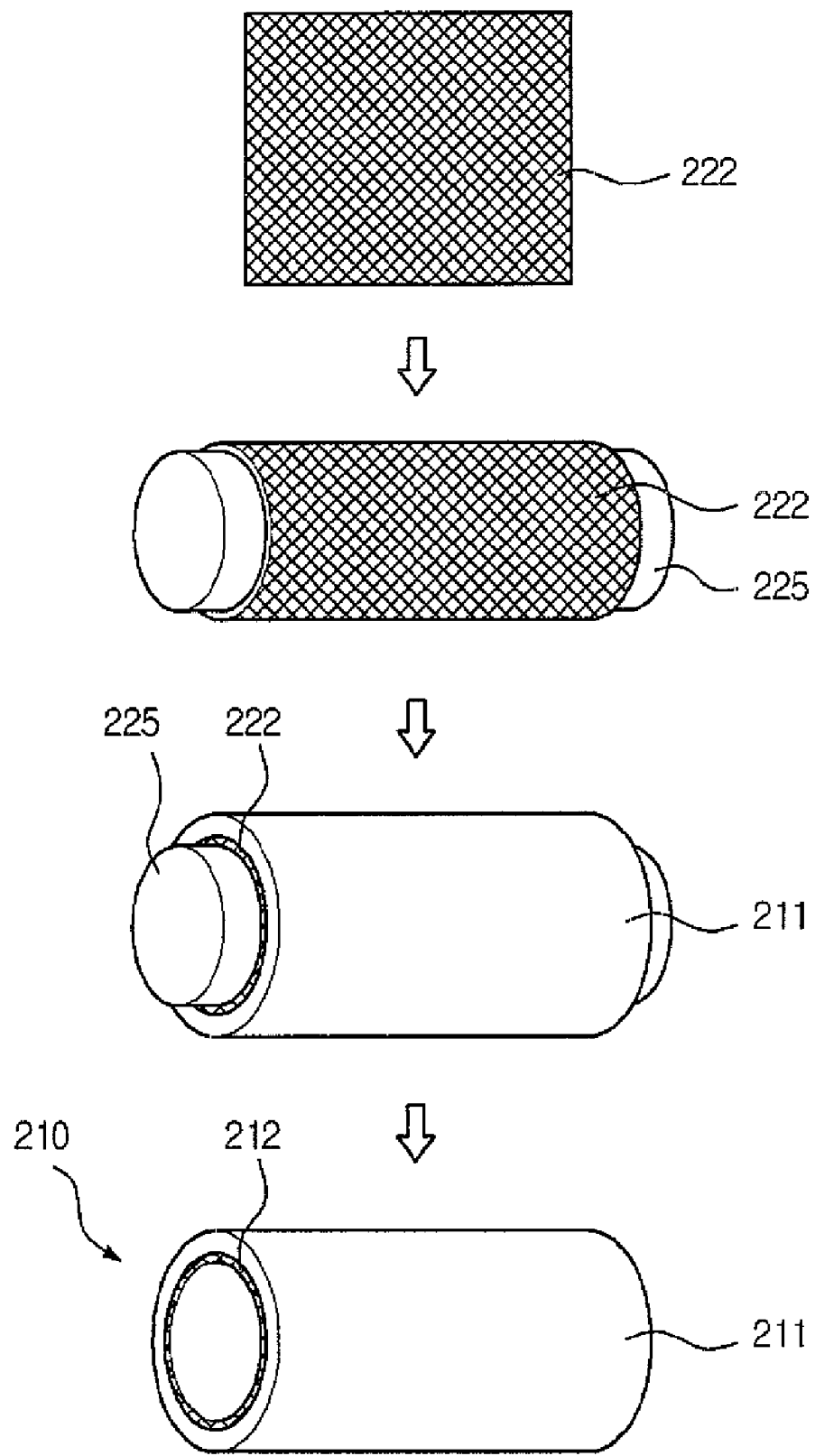

FIGS. 5 and 6 are views to show methods of manufacturing the hybrid composite journal bearing of this invention, through a simultaneous curing process. As shown in FIGS. 5 and 6, the hybrid composite journal bearing 210 is manufactured through the simultaneous curing process.

As shown in FIG. 5, a composite prepreg 222 having various laminated angles, such as 0°, 90°, etc., is wound around a mandrel 224 to which a release agent is coated. Subsequently, the mandrel 224 around which the composite prepreg 222 is wound is inserted into the metal housing 211. Next, the mandrel 224 is removed from the metal housing 211. Thereafter, the composite prepreg 222 and the metal housing 211 are wrapped with a vacuum bag 223 so that the vacuum bag 223 is in close contact with an inner surface of the prepreg 222. Next, a vacuum is applied to the inside of the vacuum bag 223 so that the composite prepreg 222 is in close contact with the inner surface of the metal housing 211. In such a status, the metal housing 211 is put in an autoclave and cured for a predetermined period, and then the vacuum bag 223 is removed. In this way, the composite liner 212 is laminated to the inner surface of the metal housing 211, thus the molding of hybrid composite journal bearing of this invention is completed.

Further, as shown in FIG. 6, the composite prepreg 222 having various laminated angles, such as 0°, 90°, etc., is wound around a mandrel 225 made of a material having a high thermal expansive coefficient, such as silicon rubber. In this case, a release agent is coated on the mandrel 225. Thereafter, the mandrel 225 around which the composite prepreg 222 is wound is inserted into the metal housing 211. Next, the metal housing 211 with the mandrel 225 is placed in an autoclave and cured for a predetermined period. At this time, the mandrel 225 thermally expands so that the composite prepreg 222 is cured while being in close contact with the inner surface of the metal housing 211. When the curing process is completed, the metal housing 211 with the mandrel 225 is taken out of the autoclave, and the mandrel 225 is removed from the metal housing 211. In this way, the composite liner 212 is laminated to the inner surface of the metal housing 211, so that the molding of hybrid composite journal bearing 210 of this invention is completed.

Figure 7:
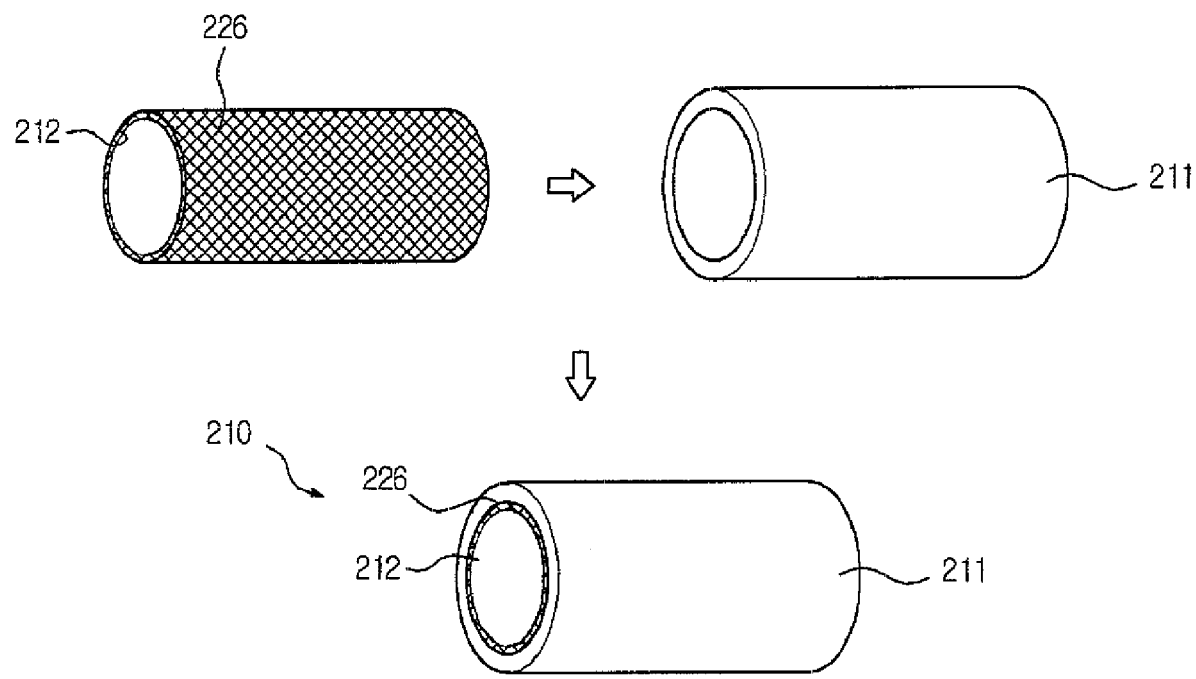
FIG. 7 is a view to show a method of manufacturing the hybrid composite journal bearing of FIG. 2, through an adhesive bonding process.

FIG. 7 is a view to show a method of manufacturing the hybrid composite journal bearing of this invention, through an adhesive bonding process. As shown in FIG. 7, the hybrid composite journal bearing 210 may be manufactured through the adhesive bonding process. That is, when it is difficult to manufacture the hybrid composite journal bearing through the co-curing process, the cured composite liner 212 may be joined to the inner surface of the metal housing 211 using an adhesive 226, as shown in FIG. 7, thus the hybrid composite journal bearing 210 is manufactured. The adhesive 226 may be selected out of an epoxy agent, an epoxy agent containing an elastomer, a cyanoacrylate adhesive, a polyurethane adhesive, etc.

Figure 8:
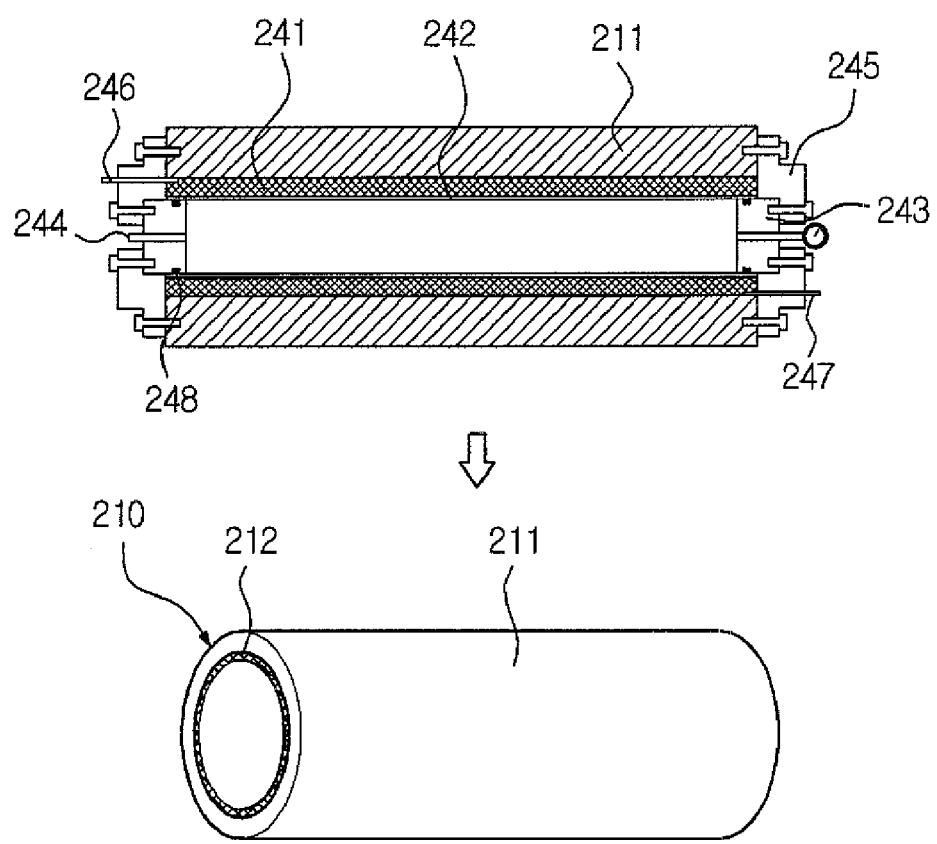
FIG. 8 is a view to show a method of manufacturing the hybrid composite journal bearing of FIG. 2, through a resin transfer molding process.

FIG. 8 is a view to show a method of manufacturing the hybrid composite journal bearing of this invention, through a resin transfer molding process. As shown in FIG. 8, the hybrid composite journal bearing 210 may be manufactured through the resin transfer molding process. That is, the journal bearing of this invention includes a reinforcing unit, covers 243, and support units 245. The reinforcing unit includes a fiber preform 241 and a soft film 242. An air inlet port 244 is provided at a predetermined portion of each of the covers 243. The support units 245 support the reinforcing unit and the covers 243 to the metal housing 211, with a resin inlet port 246 and an air outlet port 247 being respectively provided on each of the support units 245. The method of manufacturing the hybrid composite journal bearing through the resin transfer molding process is as follows.

First, both ends of the reinforcing unit having the fiber preform 241 and the film 242 are sealed with the covers 243. At this time, an O-ring 248 is fitted over an outer circumferential surface of each cover 243 so as to seal a gap between the film 242 and each cover 243. Thereafter, the reinforcing unit is positioned in the metal housing 211, and then the covers 243 are secured to the metal housing 211 using the support units 245.

Next, compressed air is fed into the film 242 through the air inlet port 244 so that the film 242 is in close contact with the fiber preform 241, thus preventing the reinforcing unit from being wrinkled or twisted when the reinforcing unit is inserted into the metal housing 211. Further, by the supply of the compressed air, the fiber preform 241 is in close contact with the inner surface of the metal housing 211.

Next, after pressure in the film 242 is eliminated, resin is injected to the fiber preform 241 through the resin inlet port 246 provided at a predetermined position of one of the support units 245, so that the resin is impregnated into the fiber preform 241. In this case, it is preferable to use phenol resin as the matrix of composite. In order to reduce pressure required for the resin transfer, the resin may be heated at about 60° so that viscosity thereof is reduced, prior to supplying the resin into the fiber preform 241. After injecting the resin into the fiber preform 241, hot air is supplied into the film 242 through a compressor equipped with a heater, thus pressurizing the film 242. Thereby, the reinforcing unit is in close contact with the inner surface of the metal housing 211, and further, air bubbles remaining in the fiber preform 241 are discharged to an outside through the air outlet port 247, so that the resin is gradually cured. At this time, a vacuum pump is connected to the air outlet port 247 to form vacuum, thus allowing the resin to be smoothly impregnated into the fiber preform 241, and efficiently removing air bubbles from the fiber preform 241, therefore maintaining a high fabric percentage by volume.

As such, the resin is cured after being impregnated into the fiber preform 241, so that the composite liner 212 is formed in the metal housing 211. At this time, the support units 245 and the covers 243 are removed from the metal housing 211, so that the molding of hybrid composite journal bearing 210 of this invention is completed. In this case, the film 242 may be removed as necessary.

The method of manufacturing the journal bearing through the resin transfer molding process can be applied to repairing or rehabilitating of a journal bearing which is commonly used. For example, the composite liner is formed in the metal housing through the resin transfer molding process, without removing the metal housing of the journal bearing which is secured to the stationary part, such as a ship, so that it is possible to repair the journal bearing. Thus, the method of manufacturing the journal bearing through the resin transfer molding process is suitable for insitu-repairing of a journal bearing for a large vessel which is used for a lengthy period.

In the hybrid composite journal bearing 210 of this invention manufactured as described above, as shown in FIG. 1, the metal housing 211 is secured to the stationary part 120, and the journal 130 is inserted into the composite liner 212. At this time, a lubrication oil film 111 is provided between the composite liner 212 and the journal 130.

In the hybrid composite journal bearing 210 constructed as described above, the composite liner 212 is laminated to the inner surface of the metal housing 211, thus reducing the friction between the journal bearing 210 and a journal 233, and preventing the journal bearing 210 from being seized to the journal 233.

Figure 9:
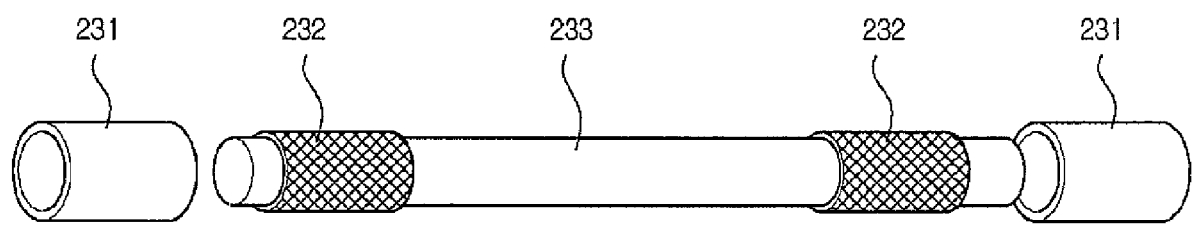
FIG. 9 is an exploded perspective view of a hybrid composite journal bearing, according to the second embodiment of the present invention.
Figure 10:
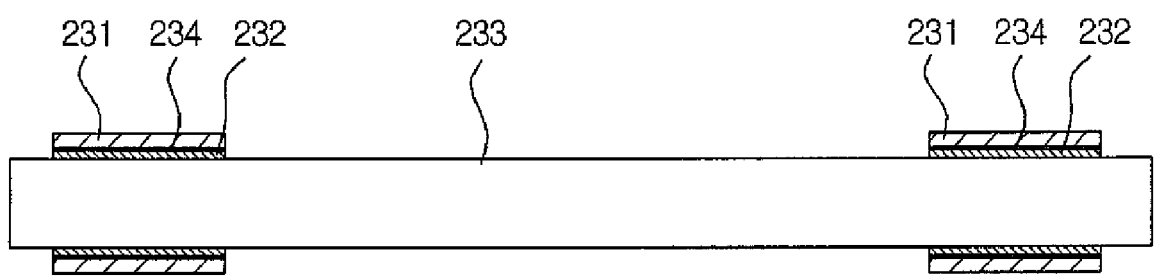
FIG. 10 is a sectional view of the hybrid composite journal bearing of FIG. 9.

FIG. 9 is an exploded perspective view of a hybrid composite journal bearing, according to the second embodiment of the present invention, and FIG. 10 is a sectional view of the hybrid composite journal bearing of FIG. 9.

As shown in FIGS. 9 and 10, when it is difficult to attach a composite to the journal bearing, the composite prepreg is laminated to a position of the journal 233 to which the journal bearing is mounted, and then is cured, so that the composite liner 232 is formed. Next, the composite liner 232 is positioned in the metal housing 231, thus the molding of hybrid composite journal bearing is completed. At this time, a lubrication oil film 234 is provided between the composite liner 232 and the metal housing 231.

When the hybrid composite journal bearing is manufactured as shown in FIGS. 9 and 10, a frictional coefficient between the journal bearing and the journal 233 is reduced, and further, the seizure of the journal bearing and the journal is prevented.

INDUSTRIAL APPLICABILITY

As described above, the present invention provides a hybrid composite journal bearing, which is constructed so that a thin composite liner is provided on an inner surface of a metal housing having a circular cross-section, thus preventing a journal from being damaged or seized to the bearing, due to friction between the metal or composite journal and the journal bearing.

Further, the present invention provides a hybrid composite journal bearing, which used small amount of expensive composite, thus accomplishing excellent performance per bearing material cost.

The present invention provides a hybrid composite journal bearing, which can be manufactured through a relatively simple method, such as the co-curing process, the adhesive bonding process, or the resin transfer molding process, as compared to conventional methods where a white metal is cast on a metal housing, or a thick glass fiber reinforced phenol composite is interferenced fitted, thus simplifying the manufacturing method and considerably reducing manufacturing costs thereof.

Further, the present invention provides a hybrid composite journal bearing, which is constructed to replace only the composite liner to be replaced with a new one when the journal bearing is damaged, thus being easy to repair.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a hybrid composite journal bearing having a metal housing secured to a stationary part of a bearing system and supporting a journal of the bearing system in such a manner that the journal is rotatable, the method comprising the steps of:

winding a composite prepreg with various laminated angles around a mandrel, with a release agent being coated on an outer surface of the mandrel;

inserting the mandrel around which the composite prepreg is wound into the metal housing, and then, removing the mandrel from the metal housing;

wrapping the composite prepreg and the metal housing with a vacuum bag and inserting the vacuum bag into the metal housing so that the composite prepreg is in close contact with the inner surface of the prepreg;

applying a vacuum to an inside of the vacuum bag so that the composite prepreg is in close contact with an inner surface of the metal housing; and placing the metal housing with the composite prepreg and the vacuum bag in an autoclave and curing the composite prepreg, and then, removing the vacuum bag.

* * * * *